US011351716B2

(12) United States Patent
Minkwitz et al.

(10) Patent No.: US 11,351,716 B2
(45) Date of Patent: Jun. 7, 2022

(54) SHRINK FILMS COMPRISING PA 6/6,6

(71) Applicant: BASF SE, Ludwigshafen am Rhein (DE)

(72) Inventors: Rolf Minkwitz, Ludwigshafen (DE); Silke Biedasek, Ludwigshafen (DE); Rony Knierim, Ludwigshafen (DE); Frank Herboth, Ludwigshafen (DE)

(73) Assignee: BASF SE

( * ) Notice: Subject to any disclaimer, the term of this patent is extended or adjusted under 35 U.S.C. 154(b) by 476 days.

(21) Appl. No.: 16/342,736

(22) PCT Filed: Oct. 24, 2017

(86) PCT No.: PCT/EP2017/077129
§ 371 (c)(1),
(2) Date: Apr. 17, 2019

(87) PCT Pub. No.: WO2018/077856
PCT Pub. Date: May 3, 2018

(65) Prior Publication Data
US 2020/0047397 A1 Feb. 13, 2020

(30) Foreign Application Priority Data

Oct. 28, 2016 (EP) .................................... 16196407

(51) Int. Cl.
*B29C 55/28* (2006.01)
*B29C 48/88* (2019.01)
*B29C 55/12* (2006.01)
*B29C 55/26* (2006.01)
*B29C 61/08* (2006.01)
*B29C 49/00* (2006.01)
*B29K 77/00* (2006.01)
*B29L 7/00* (2006.01)
*B29L 9/00* (2006.01)
*B29L 23/00* (2006.01)
*B29L 31/00* (2006.01)

(52) U.S. Cl.
CPC ............ *B29C 55/28* (2013.01); *B29C 48/912* (2019.02); *B29C 48/918* (2019.02); *B29C 48/919* (2019.02); *B29C 49/0042* (2013.01); *B29C 55/12* (2013.01); *B29C 55/26* (2013.01); *B29C 61/08* (2013.01); *B29C 2049/0089* (2013.01); *B29K 2077/00* (2013.01); *B29L 2007/00* (2013.01); *B29L 2009/00* (2013.01); *B29L 2023/00* (2013.01); *B29L 2023/001* (2013.01); *B29L 2031/712* (2013.01)

(58) Field of Classification Search
CPC .......................... B29C 55/28; B29C 49/0042
See application file for complete search history.

(56) References Cited

U.S. PATENT DOCUMENTS

| | | | |
|---|---|---|---|
| 6,699,549 B1 * | 3/2004 | Ueyama | .................. B29C 55/28 |
| | | | 428/36.7 |
| 9,200,115 B2 | 12/2015 | Plachetta et al. | |
| 2002/0034622 A1 | 3/2002 | Edwards et al. | |
| 2003/0012900 A1 | 1/2003 | Wolf et al. | |
| 2008/0119633 A1 * | 5/2008 | Nishi | .................... B29C 55/143 |
| | | | 528/332 |
| 2009/0029079 A1 | 1/2009 | Siddiqui et al. | |
| 2009/0131569 A1 * | 5/2009 | Schwitter | ................ C08L 77/00 |
| | | | 524/423 |
| 2010/0040875 A1 | 2/2010 | Patel et al. | |
| 2011/0245435 A1 | 10/2011 | Plachetta et al. | |
| 2017/0198123 A1 | 7/2017 | Zanaboni et al. | |

FOREIGN PATENT DOCUMENTS

| | | |
|---|---|---|
| CN | 1300250 A | 6/2001 |
| CN | 101616791 A | 12/2009 |
| CN | 102317351 A | 1/2012 |
| DE | 44 38 546 A1 | 5/1996 |
| EP | 0 305 966 A1 | 3/1989 |
| RU | 42979 U1 | 12/2004 |
| WO | 2004/103079 A1 | 12/2004 |
| WO | 2008/017453 A1 | 2/2008 |
| WO | 2008/040404 A1 | 4/2008 |
| WO | 2010/066769 A2 | 6/2010 |
| WO | WO 2015/114017 A1 | 8/2015 |
| WO | 2015/181333 A1 | 12/2015 |

OTHER PUBLICATIONS

ASM Handbook, vol. 08—Mechanical Testing and Evaluation Table (Year: 2000).*
International Search Report dated Dec. 7, 2017 in PCT/EP2017/077129 filed on Oct. 24, 2017.
(Continued)

*Primary Examiner* — Kelly M Gambetta
*Assistant Examiner* — Virak Nguon
(74) *Attorney, Agent, or Firm* — Faegre Drinker Biddle & Reath LLP

(57) ABSTRACT

The present invention relates to a process for producing a polymer film (P) comprising a polyamide composition (PC) by extruding the polyamide composition (PC) through an annular die and then stretching the tube thus obtained by blowing in air. The present invention further relates to the polymer film (P) obtainable by the process of the invention and to a process for packaging foodstuffs with the polymer film (P).

16 Claims, No Drawings

(56) References Cited

OTHER PUBLICATIONS

Extended European Search Report dated Apr. 10, 2017 in Patent Application No. 16196407.7, 5 pages (with English Translation of Category of Cited Documents).
U.S. Appl. No. 16/333,105, filed Mar. 13, 2019, Walter Goetz, et al.
U.S. Appl. No. 16/332,255, filed Mar. 11, 2019, Rolf Minkwitz, et al.
U.S. Appl. No. 16/331,415, filed Mar. 7, 2019, US 2019-0194392A1, Rolf Minkwitz, et al.
U.S. Appl. No. 16/075,388, filed Aug. 3, 2018, US 2019-0040216A1, Johannes Klaus Sprafke et al.
U.S. Appl. No. 16/332,986, filed Mar. 13, 2019, Rolf Minkwitz, et al.

* cited by examiner

SHRINK FILMS COMPRISING PA 6/6,6

The present invention relates to a process for producing a polymer film (P) comprising a polyamide composition (PC) by extruding the polyamide composition (PC) through an annular die and then stretching the tube thus obtained by blowing in air. The present invention further relates to the polymer film (P) obtainable by the process of the invention and to a process for packaging foodstuffs with the polymer film (P).

Polyamides are of particular industrial significance, since they feature very good mechanical properties; more particularly, they have high strength and toughness, good chemical stability and high abrasion resistance. They are used, for example, for production of fishing line, climbing ropes and carpet backings. In addition, polyamides are employed for production of packaging films and packaging wrappers.

An overview of use as packaging films and packaging wrappers and processes for production thereof is described, for example, in Encyclopedia of Polymer Science and Engineering, 2nd edition, vol. 7, pp. 73-127; vol. 10, pp. 684-695 (John Wiley & Sons 1987). However, the polyamide films described therein are very stiff and have low tear propagation resistance.

For packaging films and packaging wrappers, therefore, copolyamides that combine positive properties of various polyamides in one polymer are frequently used. The prior art describes various copolyamides.

WO 2004/103079 describes smokable planar and tubular food wrappers or films for food packaging. These films are produced by the die blowing method from a homogeneous polymer melt of a polymer mixture comprising at least polyamide together with polyvinyl alcohol and polyether-block-copolyamide. The polymer mixture has a proportion of polyamide of 40% to 80% by weight. The thickness of the food wrapper or film is in the range from 10 to 50 µm. One of the polyamides disclosed is nylon-6/6,6.

WO 2008/040404 describes multilayer planar or tubular food wrappers and films that have been produced by the die blowing method and biaxially stretched by the triple bubble method. These comprise at least seven layers. One of the layers may comprise polyamides such as polycaprolactam (nylon-6), nylon-6,6, nylon-6/6,6, nylon-11, nylon-12 or mixtures of these.

WO 2008/017453 likewise relates to multilayer planar or tubular food wrappers or films that have been produced by the die blowing method and biaxially stretched by the triple bubble method. These food wrappers or films comprise at least nine layers, wherein one layer comprises a polyamide. Suitable polyamides are, for example, nylon-6, nylon-6/6, nylon-6/6,6 and nylon-6/12.

A disadvantage of the polymer films described in WO 2004/103079, WO 2008/040404 and WO 2008/017453 is that the polymer films can frequently be stretched only with difficulty and/or have inadequate shrinkage characteristics since they shrink only slightly.

It is therefore an object of the present invention to provide a process for producing a polymer film (P) which has the disadvantages of the processes described in the prior art only to a very reduced degree, if at all. The process should additionally be performable in a very simple and inexpensive manner.

This object is achieved by a process for producing a polymer film (P) comprising a polyamide composition (PC), where the polyamide composition (PC) comprises nylon-6/6,6 and polyamide oligomers and where it is possible to extract in the range from 5% to 25% by weight, based on the total weight of the polyamide composition (PC), of polyamide oligomers from the polyamide composition (PC) according to ISO 6427:2013, comprising the steps of i) providing the polyamide composition (PC) in molten form in a first extruder, ii) extruding the polyamide composition (PC) provided in step i) in molten form from the first extruder through an annular die to obtain a tube comprising the polyamide composition (PC) in molten form, iii) cooling the tube comprising the polyamide composition (PC) in molten form obtained in step ii) in a water bath to a first temperature ($T_1$), which solidifies the polyamide composition (PC) to obtain a first tubular film comprising the polyamide composition (PC), iv) heating the first tubular film obtained in step iii) to a second temperature ($T_2$) to obtain a heated first tubular film comprising the polyamide composition (PC), v) blowing air into the heated first tubular film obtained in step iv), which stretches the heated first tubular film widthwise, and where the heated first tubular film is cooled to a third temperature ($T_3$) to obtain the polymer film (P) comprising the polyamide composition (PC).

It has been found that, surprisingly, through the use of a polyamide composition (PC) comprising nylon-6/6,6 and polyamide oligomers, where it is possible to extract in the range from 5% to 25% by weight, based on the total weight of the polyamide composition (PC), of polyamide oligomers from the polyamide composition (PC) according to ISO 6427:2013, the polymer film (P) has better stretchability and therefore also exhibits better shrinkage characteristics. The polymer films (P) of the invention are additionally safe for use with foods and have sufficiently low migration of monomers for food applications, where migration for food applications is measured according to DIN EN 1186-5:2002.

A polymer film (P) produced by the process of the invention additionally has high tear propagation resistance both in extrusion direction and at right angles thereto. This is especially advantageous when the polymer film (P) produced in accordance with the invention is used in a process for packaging foods.

It is also advantageous that the polymer film (P) produced by the process of the invention is less stiff than the polymer films produced by processes as described in the prior art. The polymer film (P) produced in accordance with the invention also has a low modulus of elasticity and high puncture resistance in the dry state. The high puncture resistance is likewise of significance especially when the polymer film (P) is used for packaging of foods.

The process of the invention is elucidated in detail hereinafter.

Step i)

In step i), the polyamide composition (PC) is provided in molten form in a first extruder.

In the context of the present invention, "a first extruder" means either exactly one first extruder or two or more first extruders.

Typically, in the process of the invention, as many first extruders are used as first layers comprising the polyamide composition (PC) that are to be present in the polymer film (P) to be produced.

If the polymer film (P) produced in the process of the invention is to comprise, for example, exactly one first layer comprising the polyamide composition (PC), exactly one first extruder is used. If the polymer film (P) is to comprise exactly two first layers comprising the polyamide composition (PC), exactly two first extruders are used. If the polymer film (P) is to comprise exactly five first layers comprising the polyamide composition (PC), exactly five first extruders are used.

For example, the polyamide composition (PC) is provided in one to eleven first extruders, preferably in one to five first extruders and more preferably in one to three first extruders. According to the invention, the polyamide composition (PC) is provided in molten form.

In the context of the present invention, "in molten form" means that the polyamide composition (PC) is provided at a temperature ($T_{PC}$) above the melting temperature ($T_{M(PC)}$) of the polyamide composition (PC). "In molten form" thus means that the polyamide composition (PC) is at a temperature ($T_{PC}$) above the melting temperature ($T_{M(PC)}$) of the polyamide composition (PC). If the polyamide composition (PC) is in molten form, the polyamide composition (PC) is free-flowing.

"Free-flowing" means that the polyamide composition (PC) can be conveyed within the first extruder and that the polyamide composition (PC) can be extruded out of the first extruder.

For example, the polyamide composition (PC) is provided in step i) at a temperature ($T_{PC}$) in the range from 180 to 330° C., preferably in the range from 190 to 300° C. and especially preferably in the range from 200 to 270° C., in each case provided that the temperature ($T_{PC}$) at which the polyamide composition (PC) is provided is above the melting temperature ($T_{M(PC)}$) of the polyamide composition (PC).

The polyamide composition (PC) can be provided in molten form in the first extruder by any methods known to those skilled in the art.

For example, the polyamide composition (PC) may be supplied to the first extruder in molten or in solid form. If the polyamide composition (PC) is supplied to the first extruder in solid form, it can be supplied to the first extruder, for example, in granular and/or pulverulent form. The polyamide composition (PC) is then melted in the first extruder and hence provided in molten form in the first extruder. This embodiment is preferred.

In addition, it is possible that the polyamide composition (PC) is produced directly in the first extruder and hence the polyamide composition (PC) is provided in molten form in the first extruder. Processes for this purpose are known to those skilled in the art.

For instance, the polyamide composition (PC) can be produced in the first extruder by mixing the nylon-6/6,6 and the polyamide oligomers with one another directly in the first extruder. It is likewise possible that the polyamide composition is produced in the first extruder by copolymerizing the caprolactam, hexamethylenediamine and adipic acid components used for the preparation of the nylon-6/6,6 described further down directly in the first extruder, forming nylon-6/6,6 and polyamide oligomers and hence the polyamide composition.

It is additionally possible that, in step i), together with the polyamide composition (PC) in molten form, additives are provided in the first extruder. The additives are typically compounded (mixed) with the polyamide composition (PC) in molten form in the first extruder. Processes for this purpose are likewise known to those skilled in the art.

Suitable additives are known to those skilled in the art and are selected, for example, from the group consisting of stabilizers, dyes, antistats, tackifiers, antiblocking agents, processing aids, antioxidants, light stabilizers, UV absorbers, lubricants and nucleating aids.

Suitable dyes are organic and inorganic pigments, for example titanium dioxide provided with a size. Suitable tackifiers are, for example, polyisobutylene (PIB) or ethylvinyl acetate (EVA). Suitable antiblocking agents are, for example, silicon dioxide or calcium carbonate particles. Suitable light stabilizers are, for example, what are called "HALS" (hindered amine light stabilizers). Processing aids or lubricants used may, for example, be ethylenebisstearamide (EBS) wax. Nucleating aids may, for example, be all kinds of organic or inorganic crystallization seed formers, for example talc.

The polyamide composition (PC) is described in detail hereinafter.

Polyamide Composition (PC)

According to the invention, the polyamide composition (PC) comprises nylon-6/6,6 and polyamide oligomers. According to the invention, it is possible to extract in the range from 5% to 25% by weight, based on the total weight of the polyamide composition (PC), of polyamide oligomers from the polyamide composition (PC) according to ISO 6427:2013.

Preferably, it is possible to extract in the range from 7% to 24% by weight and especially preferably in the range from 10% to 23% by weight of polyamide oligomers from the polyamide composition (PC) according to ISO 6427: 2013, based on the total weight of the polyamide composition (PC).

For extraction of the polyamide oligomers from the polyamide composition (PC) according to ISO 6427:2013, the polyamide composition (PC) is ground to a particle size in the range from 0.5 to 0.7 mm and then extracted in boiling methanol as extractant for 6 hours, with repeated exchange of the extractant. At the end of the extraction, solid constituents are removed. Then the extract obtained is dried, the extractable constituents (polyamide oligomers) are left behind and are weighed, and the weight is used to determine the proportion of polyamide oligomers which can be extracted from the polyamide composition (PC).

The polyamide composition (PC) may additionally comprise additional polymers, especially further polyamides. Preferably, the polyamide composition (PC) consists of nylon-6/6,6 and polyamide oligomers.

The polyamide composition (PC) typically has a glass transition temperature ($T_{G(PC)}$). The glass transition temperature ($T_{G(PC)}$) is, for example, in the range from 20 to 70° C., preferably in the range from 30 to 65° C. and especially preferably in the range from 40 to 60° C., determined according to ISO 11357-2:2013.

The present invention therefore also provides a process in which the polyamide composition (PC) has a glass transition temperature ($T_{G(PC)}$), where the glass transition temperature ($T_{G(PC)}$) is in the range from 20 to 70° C.

In the context of the present invention, the glass transition temperature ($T_{G(PC)}$) of the polyamide composition (PC) relates, in accordance with ISO 11357-2:2013, to the glass transition temperature ($T_{G(PC)}$) of the dry polyamide composition (PC).

In the context of the present invention, "dry" means that the polyamide composition (PC) comprises less than 1% by weight, preferably less than 0.5% by weight and especially preferably less than 0.1% by weight of water, based on the total weight of the polyamide composition (PC). More preferably, "dry" means that the polyamide composition (PC) does not comprise any water, and most preferably that the polyamide composition (PC) does not comprise any solvent.

It will be apparent that polyamide oligomers, in the context of the present invention, are not regarded as solvents. It is therefore most preferably in accordance with the invention that "dry" in the context of the present invention means that the polyamide composition (PC) does not comprise any solvent other than polyamide oligomers.

The glass transition temperature ($T_{G(PC)}$) of the polyamide composition (PC) is preferably below the glass transition temperature ($T_{G(P)}$) of the nylon-6/6,6.

In addition, the polyamide composition (PC) typically has a melting temperature ($T_{M(PC)}$). The melting temperature ($T_{M(PC)}$) of the polyamide composition (PC) is, for example, in the range from 178 to 187° C., preferably in the range from 179 to 186° C. and especially preferably in the range from 180 to 185° C., determined according to ISO 11357-3:2011.

The present invention therefore also provides a process in which the polyamide composition (PC) has a melting temperature ($T_{M(PC)}$) in the range from 178 to 187° C.

The polyamide composition (PC) generally has a viscosity number ($VN_{(PC)}$) in the range from 150 to 350 mL/g, determined in a 0.5% by weight solution in 96% by weight sulfuric acid at 25° C. according to EN ISO 307:2007+Amd 1:2013.

Preferably, the viscosity number ($VN_{(PC)}$) of the polyamide composition (PC) is in the range from 175 to 325 mL/g and more preferably in the range from 200 to 300 mL/g, determined in a 0.5% by weight solution in 96% by weight sulfuric acid at 25° C. according to EN ISO 307:2007+Amd 1:2013.

The present invention therefore also provides a process in which the polyamide composition (PC) has a viscosity number ($VN_{(PC)}$) in the range from 150 to 350 mL/g, determined in a 0.5% by weight solution in 96% by weight sulfuric acid at 25° C. according to EN ISO 307:2007+Amd 1:2013.

Nylon-6/6,6

In the context of the present invention, "a nylon-6/6,6" means either exactly one nylon-6/6,6 or a mixture of two or more nylons-6/6,6.

Nylon-6/6,6 is a copolymer of nylon-6 and nylon-6,6.

Nylon-6 is a polymer comprising units derived from caprolactam. Nylon-6,6 is a polymer comprising units derived from hexamethylenediamine and hexanedioic acid (adipic acid).

Preferably, the nylon-6/6,6 consists of nylon-6 and nylon-6,6. Therefore, the nylon-6/6,6 preferably consists of units derived from caprolactam, from hexamethylenediamine and from adipic acid.

In other words, nylon-6/6,6 is thus preferably a copolymer prepared proceeding from caprolactam, hexamethylenediamine and adipic acid.

The nylon-6/6,6 is preferably a random copolymer.

The nylon-6/6,6 preferably comprises in the range from 70% to 78% by weight of nylon-6 units and in the range from 22% to 30% by weight of nylon-6,6 units, based in each case on the total weight of the nylon-6/6,6.

More preferably, the nylon-6/6,6 comprises in the range from 73% to 77% by weight of nylon-6 units and in the range from 23% to 27% by weight of nylon-6,6 units, based in each case on the total weight of the nylon-6/6,6.

Most preferably, the nylon-6/6,6 comprises in the range from 74.5% to 75.5% by weight of nylon-6 units and in the range from 24.5% to 25.5% by weight of nylon-6,6 units, based in each case on the total weight of the nylon-6/6,6.

The present invention therefore also provides a process in which the nylon-6/6,6 comprises in the range from 70% to 78% by weight of nylon-6 units and in the range from 22% to 30% by weight of nylon-6,6 units, based in each case on the total weight of the nylon-6/6,6.

In the context of the present invention, the proportion of nylon-6,6 units in the nylon-6/6,6 is determined as follows: the nylon-6/6,6 is hydrolyzed in dilute (20% by weight) hydrochloric acid. This protonates the units derived from hexamethylenediamine, with the chloride ion from the hydrochloric acid forming the corresponding counterion. By means of an ion exchanger, this chloride ion is then exchanged for a hydroxide ion, releasing hexamethylenediamine. The concentration of hexamethylenediamine released is determined by titration with 0.1 molar hydrochloric acid. Proceeding from the concentration of hexamethylenediamine, it is then possible to calculate the proportion of nylon-6,6 in the nylon-6/6,6 by methods known to those skilled in the art.

The nylon-6/6,6 typically has a glass transition temperature ($T_{G(P)}$). The glass transition temperature ($T_{G(P)}$) is, for example, in the range from 20 to 70° C., preferably in the range from 30 to 65° C. and especially preferably in the range from 40 to 60° C., determined according to ISO 11357-2:2013.

The present invention therefore also provides a process in which the nylon-6/6,6 has a glass transition temperature ($T_{G(P)}$), where the glass transition temperature ($T_{G(P)}$) is in the range from 20 to 70° C.

In the context of the present invention, the glass transition temperature ($T_{G(P)}$) of the nylon-6/6,6 relates, in accordance with ISO 11357-2:2013, to the glass transition temperature ($T_{G(P)}$) of the dry nylon-6/6,6.

In the context of the present invention, "dry" means that the nylon-6/6,6 comprises less than 1% by weight, preferably less than 0.5% by weight and especially preferably less than 0.1% by weight of water, based on the total weight of the nylon-6/6,6. More preferably, "dry" means that the nylon-6/6,6 does not comprise any water, and most preferably that the nylon-6/6,6 does not comprise any solvent.

It will be apparent that, for determination of the glass transition temperature ($T_{G(P)}$), the nylon-6/6,6 does not comprise any polyamide oligomers either.

The nylon-6/6,6 additionally typically has a melting temperature ($T_{M(P)}$). The melting temperature ($T_{M(P)}$) of the nylon-6/6,6 is, for example, in the range from 180 to 187° C., preferably in the range from 181 to 186° C. and especially preferably in the range from 182 to 185° C., determined according to ISO 11357-3:2011.

The present invention therefore also provides a process in which the nylon-6/6,6 has a melting temperature ($T_{M(P)}$), where the melting temperature ($T_{M(P)}$) is in the range from 180 to 187° C.

The nylon-6/6,6 generally has a viscosity number ($VN_{(P)}$) in the range from 150 to 350 mL/g, determined in a 0.5% by weight solution in 96% by weight sulfuric acid at 25° C. according to EN ISO 307:2007+Amd 1:2013.

Preferably, the viscosity number ($VN_{(P)}$) of the nylon-6/6,6 is in the range from 175 to 325 mL/g and more preferably in the range from 200 to 300 mL/g, determined in a 0.5% by weight solution in 96% by weight sulfuric acid at 25° C. according to EN ISO 307:2007+Amd 1:2013.

The present invention therefore also provides a process in which the nylon-6/6,6 has a viscosity number ($VN_{(P)}$) in the range from 150 to 350 mL/g, determined in a 0.5% by weight solution in 96% by weight sulfuric acid at 25° C. according to EN ISO 307:2007+Amd 1:2013.

The melt volume flow rate (MVR) at 250° C. with a 5 kg weight is typically in the range from 1 to 100 mL/10 minutes, preferably in the range from 2 to 75 mL/10 minutes and more preferably in the range from 5 to 50 mL/10 minutes.

The nylon-6/6,6 preferably has a number-average molecular weight ($M_n$) in the range from 20,000 to 40,000 g/mol. Also preferably, the nylon-6/6,6 has a weight-average molecular weight ($M_w$) in the range from 70,000 to 150,000 g/mol, determined by means of SEC (size exclusion chromatography).

The determination of the number-average molecular weight ($M_n$) and of the weight-average molecular weight ($M_w$) by means of SEC was conducted as follows: a column having a column temperature of 40° C. was used, the flow rate was 1 mL/min and the injection had a volume of 100 µl. The concentration of the sample was 2 mg/mL; the eluent used was hexafluoroisopropanol with 0.05% potassium trifluoroacetate. Calibration was effected with narrow-distribution PMMA standards from PSS with molecular weights of 800 to 1,820,000 g/mol; values outside the elution range were extrapolated.

Processes for preparing the nylon-6/6,6 are known to those skilled in the art and are described, for example, in WO 2010/066769. In the process described therein for preparing copolyamides, especially nylon-6/6,6, preparation is effected continuously, proceeding from lactams and salts of diamines and dicarboxylic acids.

Polyamide Oligomers

In the context of the present invention, "polyamide oligomer" is understood to mean compounds which comprise amide units and are formed in the preparation of polyamides. These are known as such to those skilled in the art.

In the context of the present invention, polyamide oligomers preferably have a number-average molecular weight (Mn) in the range from 100 to 10,000 g/mol, preferably in the range from 200 to 8,000 g/mol and especially preferably in the range from 500 to 5,000 g/mol. The number-average molecular weight (Mn) is determined with the aid of SEC as described above.

Preferably, the polyamide oligomers of the invention form in the preparation of the nylon-6/6,6 present in the polyamide composition (PC). Therefore, polyamide oligomers preferably comprise units derived from caprolactam and/or adipic acid and/or hexamethylenediamine. Preferably, the polyamide oligomers are cyclic polyamide oligomers.

It is therefore preferable in accordance with the invention that the polyamide composition (PC) comprising nylon-6/6,6 and polyamide oligomers is formed in the preparation of the nylon-6/6,6.

Step ii)

In step ii), the polyamide composition (PC) provided in step i) is extruded in molten form from the first extruder out of an annular die to obtain a tube comprising the polyamide composition (PC) in molten form.

In the context of the present invention, "an annular die" means either exactly one annular die or two or more annular dies. Preference is given in accordance with the invention to exactly one annular die.

Suitable annular dies are all annular dies known to those skilled in the art which enable extrusion of a tube from the polyamide composition (PC) in molten form. Suitable annular dies are known as such to those skilled in the art.

If, in a preferred embodiment of the present invention, the step i1) described further down is conducted, it is preferable that, in step ii), the polyamide composition (PC) in molten form from the first extruder is combined in the annular die with the at least one further polymer (FP) described further down in molten form from the further extruder.

Especially preferably, in step ii), the polyamide composition (PC) in molten form from the first extruder is combined in the die with the at least one further polymer (FP) in molten form from the further extruder in such a way that the tube obtained in step ii), comprising the polyamide composition (PC) in molten form, comprises at least one first layer comprising the polyamide composition (PC) in molten form and at least one further layer comprising the at least one further polymer (FP) in molten form.

For example, the thickness of the tube comprising the polyamide composition (PC) in molten form is in the range from 10 µm to 1 mm, preferably in the range from 20 to 700 µm and especially preferably in the range from 50 to 500 µm.

The present invention therefore also provides a process in which the tube obtained in step ii) has a thickness in the range from 10 µm to 1 mm.

Step iii)

In step iii), the tube obtained in step ii), comprising the polyamide composition (PC) in molten form, is cooled in a water bath to a first temperature ($T_1$), which solidifies the polyamide composition (PC) to obtain a first tubular film comprising the polyamide composition (PC).

The first temperature ($T_1$) to which the tube is cooled is, for example, below the melting temperature ($T_{M(PC)}$) of the polyamide composition (PC). Preferably, the first temperature ($T_1$) is below the glass transition temperature ($T_{G(PC)}$) of the polyamide composition (PC).

For example, the first temperature ($T_1$) in step iii) is in the range from 5 to 95° C., preferably in the range from 10 to 80° C. and especially preferably in the range from 20 to 70° C.

The present invention therefore also provides a process in which the first temperature ($T_1$) in step iii) is in the range from 5 to 60° C.

The water bath comprises water. The water bath may additionally comprise further components, for example alcohols.

Preferably in accordance with the invention, the water bath consists of water.

The temperature of the water bath in step iii) is, for example, in the range from 5 to 95° C., preferably in the range from 10 to 70° C. and especially preferably in the range from 15 to 50° C.

Steps ii) and iii) can be conducted successively or simultaneously. It will be apparent that, when steps ii) and iii) are conducted simultaneously, the tube comprising the polyamide composition (PC) in molten form is obtained only briefly and in intermediate form. Typically, in that case, in the extrusion in step ii), the polyamide composition (PC) in molten form is extruded directly in tubular form into the water bath in step iii) and cooled therein, and the polyamide composition (PC) solidifies to obtain the first tubular film.

It is additionally possible that the tube comprising the polyamide composition (PC), during the cooling in step iii), is guided through a first roll system. This stretches the tube lengthwise.

The present invention therefore also provides a process in which the tube comprising the polyamide composition (PC), during the cooling in step iii), is guided through a first roll system, which stretches the tube lengthwise.

In the stretching of the tube, the polymer chains of the nylon-6/6,6 present in the polyamide composition (PC) become aligned, and the crystallinity of the nylon-6/6,6—and hence also of the polyamide composition (PC)—can increase. This process is known to those skilled in the art.

It is additionally possible that the polymer chains of any at least one further polymer (FP) present in the tube also become aligned in the stretching. This can also increase the crystallinity of the at least one further polymer (FP).

If the tube is stretched lengthwise, this means that the tube is stretched in extrusion direction. The polymer chains of the nylon-6/6,6 and of any at least one further polymer (FP) present in the polyamide composition (PC) become aligned parallel to the direction in which stretching is effected.

Step iv)

In step iv), the first tubular film obtained in step iii) is heated to a second temperature ($T_2$) to obtain a heated first tubular film comprising the polyamide composition (PC).

The first tubular film can be heated by any methods known to those skilled in the art, for example by means of infrared radiators or a heating ring around the tube.

The second temperature ($T_2$) to which the first tubular film is heated is preferably above the glass transition temperature ($T_{G(PC)}$) of the polyamide composition (PC). It is additionally preferable that the second temperature ($T_2$) is below the melting temperature ($T_{M(PC)}$) of the polyamide composition (PC).

The present invention therefore also provides a process in which the polyamide composition (PC) has a glass transition temperature ($T_{G(PC)}$) and a melting temperature ($T_{M(PC)}$) and that the second temperature ($T_2$) in step iv) is above the glass transition temperature ($T_{G(PC)}$) and below the melting temperature ($T_{M(PC)}$) of the polyamide composition (PC).

For example, the second temperature ($T_2$) in step iv) is in the range from 20 to 190° C., preferably in the range from 50 to 180° C. and especially preferably in the range from 70 to 170° C.

The present invention therefore also provides a process in which, in step iv), the first tubular film obtained in step iii) is heated to a second temperature ($T_2$) in the range from 20 to 190° C.

It will be apparent that the second temperature ($T_2$) to which the first tubular film is heated in step iv) is above the first temperature ($T_1$) to which the tube is cooled in step iii).

Step v)

In step v), air is blown into the heated first tubular film obtained in step iv), which stretches the heated first tubular film widthwise and which cools the heated first tubular film to a third temperature ($T_3$) to obtain the polymer film (P) comprising the polyamide composition (PC).

In the context of the present invention, "air" is understood to mean the gas mixture of the earth's atmosphere.

In a further embodiment of the present invention, in step v), at least one gas selected from the group consisting of nitrogen, argon and carbon dioxide is blown into the heated first tubular film obtained in step iv).

The blowing of air into the heated first tubular film obtained in step iv) can be effected by any methods known to those skilled in the art.

This stretches the heated first tubular film widthwise. This means that it is stretched at right angles to extrusion direction.

During step v), the heated first tubular film may additionally be guided through a second roll system, which additionally stretches the heated first tubular film lengthwise.

The present invention therefore also provides a process in which the heated first tubular film comprising the polyamide composition (PC), during the blowing-in of air in step v), is guided through a second roll system, which stretches the heated first tubular film lengthwise.

If the heated first tubular film is guided through a second roll system during step v) and/or the tube is guided through a first roll system during the cooling in step iii), the polymer film (P) obtained in step v) is a polymer film (P) stretched both in its extrusion direction and at right angles thereto. In that case, it is a biaxially oriented polymer film (P).

"Biaxially oriented" means that the polymer chains are aligned essentially in two different directions, preferably at right angles to one another.

In step v), the first tubular film cools down to a third temperature ($T_3$). The cooling to the third temperature ($T_3$) can be effected solely via the blowing of air into the heated first tubular film. In addition, it is possible that the heated first tubular film is additionally cooled during step v).

The third temperature ($T_3$) to which the heated first tubular film is cooled is preferably below the glass transition temperature ($T_{G(PC)}$) of the polyamide composition (PC).

For example, the third temperature ($T_3$) is in the range from 5 to 70° C., preferably in the range from 10 to 60° C. and especially preferably in the range from 15 to 50° C.

It will be apparent that the third temperature ($T_3$) to which the heated first tubular film is cooled in step v) is below the second temperature ($T_2$) to which the first tubular film is heated in step iv).

Preferably in accordance with the invention, after step v), the following steps are conducted:
vi) guiding the polymer film (P) obtained in step v) over at least one third roll,
vii) heating the polymer film (P) obtained in step v) to a fourth temperature ($T_4$) which is above the glass transition temperature ($T_{G(PC)}$) of the polyamide composition (PC) to obtain a heated polymer film (P),
viii) guiding the heated polymer film (P) obtained in step vii) over at least one fourth roll to obtain the polymer film (P), where the heated polymer film (P), between step vii) and step viii), during step viii) and/or after step viii), is cooled to a fifth temperature ($T_5$) which is below the glass transition temperature ($T_{G(PC)}$) of the polyamide composition (PC).

The present invention therefore also provides a process in which, after step v), the following steps are conducted:
vi) guiding the polymer film (P) obtained in step v) over at least one third roll,
vii) heating the polymer film (P) obtained in step v) to a fourth temperature ($T_4$) which is above the glass transition temperature ($T_{G(PC)}$) of the polyamide composition (PC) to obtain a heated polymer film (P),
viii) guiding the heated polymer film (P) obtained in step vii) over at least one fourth roll to obtain the polymer film (P), where the heated polymer film (P), between step vii) and step viii), during step viii) and/or after step viii), is cooled to a fifth temperature ($T_5$) which is below the glass transition temperature ($T_{G(PC)}$) of the polyamide composition (PC).

Steps vi) to viii) which are optionally conducted after step v) are also referred to as "annealing".

In step iv), the polymer film (P) is guided over at least one third roll.

In the context of the present invention, "at least one third roll" means either exactly one third roll or a third roll system.

Preferably, the polymer film (P) in step iv) is guided over a third roll system.

Suitable third rolls are known to those skilled in the art. Suitable third roll systems are likewise known to those skilled in the art.

The at least one third roll typically has a first rotation speed.

In one embodiment of the present invention, steps v) and vi) are conducted simultaneously. In that case, in step v), the heated first tubular film is additionally guided through a second roll system and the second roll system is the same as the at least one third roll through which the polymer film (P) is guided in step vi).

The present invention therefore also provides a process in which the heated first tubular film comprising the polyamide composition (PC), during the blowing-in of air in step v), is guided through a second roll system, wherein the heated first tubular film is stretched lengthwise and, after step v), the following steps are conducted:

vii) heating the polymer film (P) obtained in step v) to a fourth temperature ($T_4$) which is above the glass transition temperature ($T_{G(PC)}$) of the polyamide composition (PC) to obtain a heated polymer film (P), viii) guiding the heated polymer film (P) obtained in step vii) over at least one fourth roll to obtain the polymer film (P), where the heated polymer film (P), between step vii) and step viii), during step viii) and/or after step viii), is cooled to a fifth temperature ($T_5$) which is below the glass transition temperature ($T_{G(PC)}$) of the polyamide composition (PC).

In step vii), the polymer film (P) is heated to a fourth temperature ($T_4$).

The heating is preferably effected after the polymer film (P) in step vi) has been guided through the at least one third roll. When the heated first tubular film during step v) is guided through a second roll system and the at least one third roll is the same as the second roll system, the heating is preferably conducted after the guiding through the second roll system.

The heating of the polymer film (P) obtained to the fourth temperature ($T_4$) in step vii) can be effected by any methods known to those skilled in the art.

According to the invention, the fourth temperature ($T_4$) is above the glass transition temperature ($T_{G(PC)}$) of the polyamide composition (PC). It is additionally preferable that the fourth temperature ($T_4$) is below the melting temperature ($T_{M(PC)}$) of the polyamide composition (PC).

The present invention therefore also provides a process in which the fourth temperature ($T_4$) is below the melting temperature ($T_{M(PC)}$) of the polyamide composition (PC).

It will be apparent that the fourth temperature ($T_4$) to which the polymer film (P) is optionally heated in step vii) is above the third temperature ($T_3$) to which the heated first tubular film is cooled in step v).

In step viii), the heated polymer film (P) is guided through at least one fourth roll.

In the context of the present invention, "at least one fourth roll" means either exactly one fourth roll or a fourth roll system.

The at least one fourth roll typically has a second rotation speed.

Preferably in accordance with the invention, the first rotation speed of the at least one third roll is higher than the second rotation speed of the at least one fourth roll.

The heated polymer film (P), between step vii) and step viii), during step viii) and/or after step viii), is cooled to a fifth temperature ($T_5$). The fifth temperature ($T_5$) is below the glass transition temperature ($T_{G(PC)}$) of the polyamide composition (PC).

It will be apparent that the fifth temperature ($T_5$) is below the fourth temperature ($T_4$).

The cooling to the fifth temperature ($T_5$) can be effected by any methods known to those skilled in the art, for example by cooling by means of air.

By conducting steps vi) to viii), a polymer film (P) having a particularly low level of pre-shrinkage is obtained. The polymer film (P) thus shrinks only to a minor degree, if at all, between its production and its use, for example as a packaging film. The same applies when the heated first tubular film in step v) is guided through a second roll system and then steps vii) and viii) are conducted.

Polymer Film (P)

The polymer film (P) produced in accordance with the invention comprises the polyamide composition (PC).

Preferably, the polymer film (P) produced in accordance with the invention comprises in the range from 0.1% to 80% by weight of the polyamide composition (PC), based on the total weight of the polymer film (P).

More preferably, the polymer film (P) comprises in the range from 0.1% to 50% by weight of the polyamide composition (PC), more preferably in the range from 5% to 45% by weight of the polyamide composition (PC) and especially preferably in the range from 10% to 40% by weight of the polyamide composition (PC), based in each case on the total weight of the polymer film (P).

The present invention therefore also provides a process in which the polymer film (P) comprises in the range from 0.1% to 80% by weight, based on the total weight of the polymer film (P), of the polyamide composition (PC).

In addition, the polymer film preferably comprises in the range from 20% to 99.9% by weight of at least one further polymer (FP), more preferably in the range from 50% to 99.9% of at least one further polymer (FP), based on the total weight of the polymer film (P), more preferably in the range from 55% to 95% by weight and especially preferably in the range from 60% to 90% by weight of at least one further polymer (FP), based in each case on the total weight of the polymer film (P).

The sum totals of the percentages by weight of the polyamide composition (PC) and the at least one further polymer (FP) present in the polymer film (P) typically add up to 100% by weight.

In the context of the present invention, "at least one further polymer (FP)" means either exactly one further polymer (FP) or a mixture of two or more further polymers (FP).

Polymers suitable as the at least one further polymer (FP) are all polymers known to those skilled in the art. It will be apparent that the at least one further polymer (FP) is different than the nylon-6/6,6 present in the polyamide composition (PC).

Preferably, the at least one further polymer (FP) is selected from the group consisting of polyolefins, poly(ethylene-vinyl alcohols), poly(ethylene-vinyl acetates), polyethylene terephthalates, polyvinylidene chlorides, maleic anhydride-grafted polyolefins, polyesters and ionomers.

More preferably, the at least one further polymer (FP) is selected from the group consisting of polyolefins, poly(ethylene-vinyl alcohols), poly(ethylene-vinyl acetates), polyethylene terephthalates, polyvinylidene chlorides and maleic anhydride-grafted polyolefins.

Most preferably, the at least one further polymer (FP) is selected from the group consisting of polyolefins, maleic anhydride-grafted polyolefins and ethyl-vinyl alcohols.

If the at least one further polymer (FP) is selected from the group consisting of polyolefins, it is preferable that, in addition, maleic anhydride-grafted polyolefins are used as at least one further polymer (FP). It is possible here that the at least one further polymer (FP) used is a mixture of polyolefins and maleic anhydride-grafted polyolefins. It is likewise possible that, when the polymer film (P) is a multilayer film described below, the polymer film (P) comprises at least one first further layer of at least one further polymer (FP), where the at least one further polymer (FP) of the first further layer is selected from the group consisting of maleic anhydride-grafted polyolefins and the polymer film (P) comprises at least one second further layer of at least one further polymer (FP), where the at least one further polymer (FP) of the second further layer is selected from the group consisting of polyolefins. The polymer film (P) in that case preferably comprises the first further layer between the first layer comprising the polyamide composition (PC) and the second further layer.

Polyolefins as such are known to those skilled in the art. Preferred polyolefins are polypropylene (PP), low-density polyethylene (LDPE), linear low-density polyethylene (LLDPE) and very low-density polyethylene (VLDPE).

Linear low-density polyethylene (LLDPE) is a copolymer of ethylene and at least one $C_4$-$C_8$-$\alpha$-olefin. Linear low-density polyethylene (LLDPE) features long polymer chains with short side chains. The length of the side chains in linear low-density polyethylene (LLDPE) is typically shorter than in low-density polyethylene (LDPE) and in medium-density polyethylene (MDPE). The melting point of linear low-density polyethylene (LLDPE) is preferably in the range from 110 to 130° C.; its density is in the range from 0.91 to 0.93 g/cm$^3$.

Very low-density polyethylenes (VLDPE) are copolymers of ethylene and at least one $C_4$-$C_8$-$\alpha$-olefin. They typically have a melting point in the range from 110 to 130° C. and a density in the range from 0.86 to <0.91 g/cm$^3$. The proportion of $C_4$-$C_8$-$\alpha$-olefins in VLDPE is generally higher than in LLDPE.

In the context of the present invention, "$C_4$-$C_8$-$\alpha$-olefins" are understood to mean linear and branched, preferably linear, alkylenes having 4 to 8 carbon atoms that are unsaturated in the $\alpha$ position, i.e. have a C—C double bond in the $\alpha$ position. Examples of these are 1-butene, 1-pentene, 1-hexene, 1-heptene and 1-octene. 1-Butene, 1-hexene and 1-octene are preferred.

Preferred poly(ethylene-vinyl acetates) are copolymers of ethylene with vinyl acetate. For example, they are prepared using in the range from 82% to 99.9% by weight of ethylene and in the range from 0.1% to 18% by weight of vinyl acetate, preferably in the range from 88% to 99.9% by weight of ethylene and in the range from 0.1% to 12% by weight of vinyl acetate.

Preferred poly(ethylene-vinyl alcohols) are obtainable by complete or partial hydrolysis of the above-described poly (ethylene-vinyl acetates). For example, the poly(ethylene-vinyl alcohols) comprise in the range from 50 to 75 mol % of ethylene and in the range from 25 to 50 mol % of vinyl alcohol, based on the total molar amount of the poly (ethylene-vinyl alcohols).

The polymer film (P) may comprise the at least one further polymer (FP) in the form of a blend (mixture) with the polyamide composition (PC). It is likewise possible and preferable in accordance with the invention that the polymer film (P) comprises at least one first layer comprising the polyamide composition (PC), and the polymer film (P) comprises at least one further layer comprising the at least one further polymer (FP).

In this embodiment, it is preferable that the at least one first layer comprising the polyamide composition (PC) does not comprise any further polymer (FP).

In the context of the present invention, "at least one first layer" means either exactly one first layer or two or more first layers.

As already described above, the number of first layers arises from the number of first extruders which are used in step i) of the process of the invention.

In the context of the present invention, "at least one further layer" means either exactly one further layer or two or more further layers.

Two or more further layers are preferable.

As explained above, the number of further layers arises from the number of further extruders which are used in any embodiment of the process of the invention.

It is thus preferable in accordance with the invention that the polymer film (P) comprises at least one first layer comprising the polyamide composition (PC), and the polymer film (P) also comprises at least one further layer, where the at least one further layer comprises at least one further polymer (FP) selected from the group consisting of polyolefins, poly(ethylene-vinyl alcohols), poly(ethylene-vinyl acetates), polyethylene terephthalates, polyvinylidene chlorides and maleic anhydride-grafted polyolefins.

The present invention thus also provides a process in which the polymer film (P) comprises at least one first layer comprising the polyamide composition (PC), and the polymer film (P) comprises at least one further layer, where the at least one further layer comprises at least one further polymer (FP) selected from the group of polyolefins, poly (ethylene-vinyl alcohols), poly(ethylene-vinyl acetates), polyethylene terephthalates, polyvinylidene chlorides and maleic anhydride-grafted polyolefins.

If the polymer film (P) does not comprise any further layer apart from the at least one first layer, the polymer film (P) is also referred to as "monofilm". If the polymer film (P) is a monofilm, it may comprise exactly one first layer and no further layer. It is likewise possible that it comprises two or more first layers and no further layer. If the polymer film (P) comprises two or more first layers and is a monofilm, the two or more first layers all have the same composition.

In that case, each of the first layers comprises the polyamide composition (PC). In that case, preferably each of the first layers comprises in the range from 0.1% to 80% by weight, more preferably in the range from 0.1% to 50% by weight, preferably in the range from 5% to 45% by weight and especially preferably in the range from 10% to 40% by weight of the polyamide composition (PC), based in each case on the total weight of the polymer film (P).

If the polymer film (P) comprises at least one first layer comprising the polyamide composition (PC) and at least one further layer comprising the at least one further polymer (FP), the polymer film (P) is also referred to as "multilayer film". In this embodiment, the at least one first layer may consist of the polyamide composition (PC).

For example, the polymer film (P) in that case comprises one to eleven first layers comprising the polyamide composition (PC), and one to thirteen further layers comprising the at least one further polymer (FP). Preferably, the polymer film (P) in that case comprises one to five first layers comprising the polyamide composition (PC), and one to eleven further layers comprising the at least one further polymer (FP). Especially preferably, the polymer film (P) in that case comprises one to three first layers comprising the polyamide composition (PC), and one to seven further layers comprising the at least one further polymer (FP).

In a preferred embodiment of the present invention, the at least one first layer in that case consists of the polyamide composition (PC). It is likewise preferable that the at least one further layer consists of the at least one further polymer (FP).

In the context of the present invention, the term "polymer film (P)" thus encompasses both monofilms and multilayer films, preference being given to multilayer films.

The present invention therefore also provides a process in which the polymer film (P) is a multilayer film.

The present invention thus also provides a process in which the polymer film (P) comprises in the range from 0.1% to 80% by weight, based on the total weight of the polymer film (P), of the polyamide composition (PC) and/or the polymer film (P) is a multilayer film.

The polymer film (P) has a thickness, for example, in the range from 0.1 µm to <1 mm, preferably a thickness in the range from 5 to 500 µm and especially preferably a thickness in the range from 20 to 100 µm.

The present invention therefore also provides a process in which the polymer film (P) has a thickness in the range from 0.1 µm to <1 mm.

If the polymer film (P) is a monofilm and comprises exactly one first layer, the first layer has the same thickness as the polymer film (P), i.e., for example, in the range from 0.1 µm to <1 mm, preferably in the range from 5 to 500 µm and especially preferably in the range from 20 to 100 µm.

If the polymer film (P) is a monofilm and comprises two or more first layers, the thickness of each first layer is typically less than the thickness of the polymer film (P). The sum total of the thicknesses of the individual first layers in that case generally corresponds to the thickness of the polymer film (P). For example, the at least one first layer comprising the polyamide composition (PC) in that case has a thickness in the range from 0.1 to 100 µm, preferably in the range from 0.5 to 50 µm and especially preferably in the range from 0.5 to 15 µm.

If the polymer film (P) is a multilayer film, the thickness of the individual layers of the polymer film (P), i.e. the thickness of the at least one first layer comprising the polyamide composition (PC) and the thickness of the at least one further layer comprising the at least one further polymer (FP), is typically less than the thickness of the polymer film (P). The sum total of the thicknesses of the individual layers in that case generally corresponds to the thickness of the polymer film (P).

For example, the at least one first layer comprising the polyamide composition (PC) in that case has a thickness in the range from 0.1 to 100 µm, preferably in the range from 0.5 to 50 µm and especially preferably in the range from 0.5 to 15 µm.

The at least one further layer comprising the at least one further polymer (FP) in that case has a thickness, for example, in the range from 0.1 to 100 µm, preferably in the range from 0.5 to 50 µm and especially preferably in the range from 0.5 to 15 µm.

The polymer film (P) may comprise at least one adhesion promoter. This embodiment is preferable when the polymer film (P) is a multilayer film.

In the context of the present invention, "at least one adhesion promoter" means either exactly one adhesion promoter or a mixture of two or more adhesion promoters.

If the polymer film (P) is a multilayer film, the at least one adhesion promoter may be present in the at least one first layer together with the polyamide composition (PC). It is likewise possible that the at least one adhesion promoter is present in the at least one further layer together with the at least one further polymer (FP). Furthermore, it is possible that the at least one adhesion promoter is present as at least one additional layer in the polymer film (P). This embodiment is preferred.

It will be apparent that, when the polymer film (P) comprises at least one adhesion promoter, the sum total of the percentages by weight of the polyamide composition (PC), of the at least one further polymer (FP) and of the at least one adhesion promoter adds up to 100% by weight.

If the at least one adhesion promoter is present as at least one additional layer in the polymer film (P), the at least one adhesion promoter, in the process of the invention, is typically provided in an additional extruder and then likewise extruded therefrom in step ii) through the annular die.

When the at least one adhesion promoter is present as at least one additional layer in the polymer film (P), this at least one additional layer is preferably arranged between the at least one further layer comprising the at least one further polymer (FP) and the at least one first layer comprising the polyamide composition (PC).

The at least one layer of the at least one adhesion promoter has a thickness, for example, of 0.1 to 100 µm, preferably in the range from 0.5 to 50 µm and especially preferably in the range from 0.5 to 15 µm.

Suitable adhesion promoters are known as such to those skilled in the art. Preferred adhesion promoters are copolymers of ethylene with maleic anhydride or a copolymer of ethylene with vinyl acetate. Preference is given to a copolymer of linear low-density polyethylene (LLDPE) and maleic anhydride or a copolymer of ethylene and vinyl acetate, where the copolymer is prepared using >18% by weight of vinyl acetate and <82% by weight of ethylene. These copolymers are commercially available, for example under the Bynel 4105 trade name from DuPont or Escorene FL00119 from Exxon.

Preferred copolymers of ethylene with maleic anhydride used as adhesion promoters are maleic anhydride-grafted polymers or copolymers of ethylene.

The polymer film (P) may also comprise additives when they have been provided in the first extruder together with the polyamide composition (PC) and/or in the further extruder together with the at least one further polymer (FP). The details and preferences described above are correspondingly applicable to the additives.

The additives may be present either in the at least one first layer or in the at least one further layer. They may be present in just one of these layers; it is likewise possible that they are present in each of these layers.

It will be clear to the person skilled in the art that, when the additives are provided together with the polyamide composition (PC) in the first extruder, the additives are present in the first layer. If the additives are provided together with the at least one further polymer (FP) in the further extruder, the additives are present in the further layer.

The present invention therefore also provides a polymer film obtainable by the process of the invention.

If the polymer film (P) is to comprise at least one further polymer (FP) the process of the invention preferably additionally comprises a step i1), providing at least one further polymer (FP) in molten form in a further extruder, where step i1) is conducted prior to step ii).

The present invention therefore also provides the process of the invention additionally comprising step i1) providing at least one further polymer (FP) in molten form in a further extruder,
where step i1) is conducted prior to step ii).

More preferably, step i1) is conducted simultaneously with step i).

It will be apparent that, when step i1) is conducted, the tube obtained in step ii) will additionally comprise the further polymer (FP) in molten form. The first tubular film obtained in step iii) and the heated first tubular film obtained in step iv) will then likewise additionally comprise the at least one further polymer (FP).

Preferably, the process for producing the polymer film (P) in that case comprises the following steps:
i) providing the polyamide composition (PC) in molten form in a first extruder,
i1) providing at least one further polymer (FP) in molten form in a further extruder,
ii) extruding the polyamide composition (PC) provided in step i) in molten form from the first extruder through an annular die and extruding the at least one further polymer (FP) provided in step i1) in molten form from the further extruder through the annular die to obtain a tube comprising the polyamide composition (PC) and the at least one further polymer (FP) each in molten form,
iii) cooling the tube obtained in step ii), comprising the polyamide composition (PC) and the at least one further polymer (FP) each in molten form, in a water bath to a first temperature ($T_1$), which solidifies the polyamide composition (PC) and the at least one further polymer (FP) to obtain a first tubular film comprising the polyamide composition (PC) and the at least one further polymer (FP),
iv) heating the first tubular film obtained in step iii) to a second temperature ($T_2$) to obtain a heated first tubular film comprising the polyamide composition (PC) and the at least one further polymer (FP),
v) blowing air into the heated first tubular film obtained in step iv), which stretches the heated first tubular film widthwise and which cools the heated first tubular film to a third temperature ($T_3$) to obtain the polymer film (P) comprising the polyamide composition (PC) and the at least one further polymer (FP).

The present invention therefore also provides a process for producing a polymer film (P) comprising in the range from 0.1% to 80% by weight, based on the total weight of the polymer film (P), of a polyamide composition (PC), and in the range from 20% to 99.9% by weight, based on the total weight of the polymer film (P), of at least one further polymer (FP), where the polyamide composition (PC) comprises nylon-6/6,6 and polyamide oligomers, and where it is possible to extract in the range from 5% to 25% by weight, based on the total weight of the polyamide composition (PC), of polyamide oligomers from the polyamide composition (PC) according to ISO 6427:2013, comprising the steps of
i) providing the polyamide composition (PC) in molten form in a first extruder,
i1) providing at least one further polymer (FP) in molten form in a further extruder,
ii) extruding the polyamide composition (PC) provided in step i) in molten form from the first extruder through an annular die and extruding the at least one further polymer (FP) provided in step i1) in molten form from the further extruder through the annular die to obtain a tube comprising the polyamide composition (PC) and the at least one further polymer (FP) each in molten form,
iii) cooling the tube obtained in step ii), comprising the polyamide composition (PC) and the at least one further polymer (FP) each in molten form, in a water bath to a first temperature ($T_1$), which solidifies the polyamide composition (PC) and the at least one further polymer (FP) to obtain a first tubular film comprising the polyamide composition (PC) and the at least one further polymer (FP),
iv) heating the first tubular film obtained in step iii) to a second temperature ($T_2$) to obtain a heated first tubular film comprising the polyamide composition (PC) and the at least one further polymer (FP),
v) blowing air into the heated first tubular film obtained in step iv), which stretches the heated first tubular film widthwise and which cools the heated first tubular film to a third temperature ($T_3$) to obtain the polymer film (P) comprising the polyamide composition (PC) and the at least one further polymer (FP).

In the context of the present invention, "a further extruder" means exactly one further extruder or two or more further extruders. Preference is given to two or more further extruders.

Preferably, as many further extruders are used as further layers comprising the at least one further polymer (FP) are to be present in the polymer film (P). For example, one to thirteen further extruders are used, preferably one to eleven further extruders and especially preferably one to seven further extruders.

If the polymer film (P) is to comprise exactly one further layer comprising the at least one further polymer (FP), for example, exactly one further extruder is used. If the polymer film (P) is to comprise exactly two further layers comprising the at least one further polymer (FP), exactly two further extruders are used. If the polymer film (P) is to comprise exactly five further layers comprising the at least one further polymer (FP), exactly five further extruders are used.

The details and preferences described for the first extruder above are correspondingly applicable to the further extruder.

According to the invention, the at least one further polymer (FP) in step i1) is provided in molten form. "In molten form" means that the at least one further polymer (FP) is provided at a temperature above the melting temperature ($T_{M(FP)}$) of the at least one further polymer (FP). "In molten form" thus means that the at least one further polymer (FP) has a temperature above the melting temperature ($T_{M(FP)}$) of the at least one further polymer (FP). If the at least one further polymer (FP) is in molten form, the at least one further polymer (FP) is free-flowing.

"Free-flowing" means that the at least one further polymer (FP) can be conveyed within the further extruder, and that the at least one further polymer (FP) can be extruded out of the further extruder.

For example, the at least one further polymer (FP) in step i1) is provided at a temperature in the range from 120 to 350° C., preferably in the range from 130 to 300° C. and especially preferably in the range from 140 to 250° C., in each case with the prerequisite that the temperature at which the at least one further polymer (FP) is provided is above the melting temperature ($T_{M(FP)}$) of the at least one further polymer (FP).

The at least one further polymer (FP) may be provided in molten form in the further extruder by any methods known to those skilled in the art. For example, the at least one further polymer (FP) may be supplied to the further extruder in molten or solid form. If the at least one further polymer (FP) is supplied to the further extruder in solid form, it can be supplied to the further extruder, for example, in granular and/or pulverulent form. The at least one further polymer (FP) is then melted in the further extruder and hence provided in molten form in the further extruder.

It is additionally possible that, in step i1), together with the at least one further polymer (FP) in molten form, additives are provided in the further extruder. The additives are typically compounded (mixed) with the at least one further polymer (FP) in molten form in the further extruder. Processes for this purpose are known to those skilled in the art.

The details and preferences described above for the additives that are optionally provided together with the polyamide composition (PC) in molten form in the first extruder are correspondingly applicable to the additives that are optionally provided together with the further polymer (FP) in molten form in the further extruder.

The additives that are optionally provided together with the further polymer (FP) in molten form in the further extruder and the additives that are optionally provided together with the polyamide composition (PC) in molten form in the first extruder may be the same or different. Preferably, the additives that are optionally provided together with the further polymer (FP) in molten form in the further extruder are different than the additives that are optionally provided together with the polyamide composition (PC) in molten form in the first extruder.

The details and preferences described above for steps i), ii), iii), iv) and v) for preparation of the polymer film (P) comprising the polyamide composition (PC) are correspondingly applicable to steps i), ii), iii), iv) and v) for preparation of the polymer film (P) comprising the polyamide composition (PC) and the at least one further polymer (FP).

The tube obtained in step ii), comprising the polyamide composition (PC) and the at least one further polymer (FP) each in molten form, comprises the polyamide composition (PC) in at least one first layer and the at least one further polymer (FP) in at least one further layer. Typically, the tube obtained in step ii) comprises as many first layers comprising the polyamide composition (PC) in molten form as first extruders have been used in step i), and as many further layers comprising the at least one further polymer (FP) in molten form as further extruders have been used in step i1).

The first temperature ($T_1$) in step iii), when step i1) is conducted, is preferably also below the melting temperature ($T_{M(FP)}$) of the at least one further polymer (FP).

The second temperature ($T_2$) in step iv), when step i1) is conducted, is preferably also above the glass transition temperature ($T_{G(FP)}$) of the at least one further polymer (FP) and especially preferably also below the melting temperature ($T_{M(FP)}$) of the at least one further polymer (FP).

The third temperature ($T_3$) in step v), when step i1) is conducted, is preferably below the melting temperature ($T_{M(FP)}$) of the at least one further polymer (FP).

It will be apparent that, when step i1) is conducted, the polymer film (P) obtained in step v) is a multilayer film.

Packaging of Foodstuffs

The polymer film (P) produced in accordance with the invention can be used in a process for packaging foodstuffs.

The present invention therefore also provides for the use of the polymer film (P) of the invention for packaging foodstuffs.

For example, a process for packaging foodstuffs comprises the following steps:

a) providing a foodstuff encased by at least one polymer film (P) of the invention, where the at least one polymer film (P) has a provision temperature ($T_B$),
b) heating the at least one polymer film (P) to a shrink temperature ($T_S$), which shrinks the at least one polymer film (P) to obtain a foodstuff encased by the at least one shrunk polymer film (P).

The present invention therefore also provides a process for packaging foodstuffs, comprising the steps of a) providing a foodstuff encased by at least one polymer film (P) according to claim 12, where the at least one polymer film (P) has a provision temperature ($T_B$),
b) heating the at least one polymer film (P) to a shrink temperature ($T_S$), which shrinks the at least one polymer film (P) to obtain a foodstuff encased by the at least one shrunk polymer film (P).

In step a), the foodstuff encased by at least one polymer film (P) of the invention is provided.

The details and preferences described above for the polymer film (P) apply correspondingly to the at least one polymer film (P).

Suitable foodstuffs are all known foodstuffs. Especially suitable are cheese products, meat products and sausage products.

In the context of the present invention, "encased by the at least one polymer film (P)" means that at least 20%, preferably at least 50%, especially preferably at least 80% and most preferably 100% of the surface area of the foodstuff is covered by the at least one polymer film (P). "Covered" means that the at least one polymer film (P) and the surface of the foodstuff can be in direct contact with one another. It is likewise possible that air is present at least to some degree between the surface of the foodstuff and the at least one polymer film (P).

The at least one polymer film (P) in step a) has a provision temperature ($T_B$).

The provision temperature ($T_B$) is preferably below the glass transition temperature ($T_{G(PC)}$) of the polyamide composition (PC) present in the at least one polymer film (P).

For example, the polymer film (P) has a provision temperature ($T_B$) in the range from 5 to 50° C., preferably in the range from 10 to 45° C. and especially preferably in the range from 15 to 40° C.

The present invention therefore also provides a process for packaging foodstuffs, wherein the provision temperature ($T_B$) is below the glass transition temperature ($T_{G(PC)}$) of the polyamide composition (PC) present in the at least one polymer film (P).

The present invention further provides a process for packaging foodstuffs, wherein the provision temperature ($T_B$) in step a) is in the range from 5 to 50° C.

In step b), the at least one polymer film (P) is heated to a shrink temperature ($T_S$). The shrink temperature ($T_S$) is therefore above the provision temperature ($T_B$) of the polymer film (P).

Preferably, the shrink temperature ($T_S$) is above the glass transition temperature ($T_{G(PC)}$) of the polyamide composition (PC) present in the at least one polymer film (P). For example, the shrink temperature ($T_S$) is in the range from 50 to 150° C., preferably in the range from 65 to 135° C. and especially preferably in the range from 75 to 125° C.

The present invention therefore also provides a process for packaging foodstuffs, in which the shrink temperature ($T_S$) in step b) is in the range from 50 to 150° C.

The present invention further provides a process for packaging foodstuffs, in which the shrink temperature ($T_S$) in step b) is above the glass transition temperature ($T_{G(PC)}$) of the polyamide composition (PC) present in the at least one polymer film (P).

The at least one polymer film (P) may be heated to the shrink temperature ($T_S$) by any methods known to those skilled in the art. For example, it can be heated to the shrink temperature ($T_S$) by means of steam or hot air. In step b), the at least one polymer film (P) shrinks. The at least one polymer film (P) may already shrink while it is being heated to the shrink temperature ($T_S$). It is likewise possible that the at least one polymer film (P) does not shrink until its temperature is at the shrink temperature ($T_S$).

In the context of the present invention, "shrinking" means that the volume of the at least one polymer film (P) decreases compared to the volume of the at least one polymer film (P) having the provision temperature ($T_B$). For example, the volume of the at least one polymer film (P) decreases by 10 to 80%, preferably by 20 to 70% and especially preferably by 30 to 60%, based in each case on the volume of the at least one polymer film (P) having the provision temperature ($T_B$).

The at least one shrunk polymer film (P) may wholly or partly encase the foodstuff in step b).

For example, the at least one shrunk polymer film (P) covers at least 20%, preferably at least 50%, especially preferably at least 80% and most preferably 100% of the surface of the foodstuff. "Covered" means that the at least one shrunk polymer film (P) and the surface of the foodstuff can be in direct contact with one another. It is likewise possible that air is present at least to some degree between the surface of the foodstuff and the at least one shrunk polymer film (P).

The at least one shrunk polymer film (P) that encases the foodstuff has a particularly high oxygen barrier and therefore protects the foodstuff particularly efficiently from the ingress of oxygen.

The present invention is elucidated in detail hereinafter by examples, without restricting it thereto.

EXAMPLES

The properties of the polymer films and of the components present were determined as follows:

The viscosity number ($VN_{(PC)}$) of the polyamide composition (PC) was determined in a 0.5% by weight solution in 96% by weight sulfuric acid at 25° C. according to EN ISO 307:2007+Amd 1:2013.

The glass transition temperature ($T_G$) and melting temperature ($T_M$) both of the polyamide composition (PC) and of the further polymers (FP) were determined according to ISO 11357-1:2009, ISO 11357-2: 2013 and ISO 11357-3: 2011. For this purpose, two heating runs were conducted and the glass transition temperature ($T_G$) and melting temperature ($T_M$) were each ascertained from the second heating run.

The density of the polyamide composition (PC) and of the further polymers (FP) was determined by the gas pycnometer method according to EN ISO 1183-3:1999.

To determine the proportion of nylon-6,6 in the nylon-6/6,6, the polyamide composition (PC) was hydrolyzed in dilute hydrochloric acid (20%). This protonates the units derives from hexamethylenediamine, with the chloride ion from the hydrochloric acid forming the counterion. By means of ion exchanger, this chloride ion was then exchanged for a hydroxide ion with release of hexamethylenediamine. By titration with 0.1 molar hydrochloric acid, the hexamethylenediamine concentration is then determined, from which the proportion of nylon-6,6 in the nylon-6/6,6 can be calculated.

The proportion of polyamide oligomers that can be extracted from the polyamide composition (PC) was determined according to ISO 6427:2013 in methanol.

The area stretching ratio was reported as the product of the stretching ratios in extrusion direction (MD) and at right angles thereto (TD). For this purpose, the first tubular film, prior to step v), was guided through a conveying roll system and the polymer film (P), during step v), was guided through a second roll system with a higher roll speed than the conveying roll system, such that it was stretched lengthwise. The stretching ratio in MD was read off from the roll speeds of the conveying roll system (prior to stretching) and the second roll system (after stretching); the stretching ratio in TD was determined with a slide gauge on the inflated tube.

Hot shrinkage was determined in water at 90° C. First, a specimen of length 30 cm of the tube, directly after stretching, was cut by guiding it through a second roll system in step v). This tube was laid flat and cut open at the bent edges, and one side was discarded. A 10 cm*10 cm square was drawn on the remaining side of the tube. The lateral edges were each drawn parallel to extrusion direction (MD) or at right angles thereto (TD), and the individual centimeters between 0 and 10 cm were each marked individually. This marked film was then immediately immersed into water at 90° C. for 5 min. After the water bath, the edge lengths of the square were determined again and shrinkage values in MD and TD were thus obtained in each case from the difference between the originally drawn 10 cm minus the length present after shrinkage.

The modulus of elasticity of the polymer films was determined according to ISO 527-3:1995.

Tear propagation resistance was determined according to Elmendorf, DIN ISO 6383-2:2004 in extrusion direction (MD) and at right angles thereto (TD). The polymer films were conditioned under standard climatic conditions for non-tropical countries according to DIN EN ISO 291:2008.

The area-based specific migration of the monomers present in the polyamide composition was determined in Simulant C of DIN EN 1186-5:2002 at 60° C. for 10 days. This was used to calculate the contents-based specific migration according to EU 10/2011.

The impact resistance (dart drop) of the monofilms was determined according to DIN ISO 7765-2:1994 with 5 specimens at a relative air humidity of 50% (50% RH), with reporting of the fracture energy in the present case.

The following components were used:
Polyamide Compositions:
P-1 Nylon-6 from BASF SE®, sold under the Ultramid B40L brand name, with 1.03% by weight of extractable polyamide oligomers. The viscosity number (VN) was 250 mL/g, the glass transition temperature ($T_G$) 57° C., the melting temperature ($T_M$) 220° C. and the density 1.15 g/mL.

P-2 Copolymer of nylon-6 and nylon-6,6 (nylon-6/6,6) from BASF SE®, sold under the Ultramid C40L brand name, with a nylon-6,6 level of 16.8 and 2.43% by weight of extractable polyamide oligomers. The viscosity number (VN) was 250 mL/g, the glass transition temperature ($T_G$) 53° C., the melting temperature ($T_M$) 188° C. and the density 1.143 g/mL.

P-3 Copolymer of nylon-6 and nylon-6,6 (nylon-6/6,6) with a nylon-6,6 level of 22.6, prepared according to WO 2010/066769 A2, and 18.33% by weight of extractable polyamide oligomers with a number-average molecular weight of 1760 g/mol. The viscosity number (VN) was 213 mL/g, the glass transition temperature ($T_G$) 58° C., the melting temperature ($T_M$) 183° C. and the density 1.14 g/mL.

P-4 Copolymer of nylon-6 and nylon-6,6 (nylon-6/6,6) with a nylon-6,6 level of 24.6, prepared according to WO 2010/066769 A2, and 20.7% by weight of extractable polyamide oligomers with a number-average molecular weight of 9020 g/mol. The viscosity number (VN) was 209 mL/g, the glass transition temperature ($T_G$) 57° C., the melting temperature ($T_M$) 181.5° C. and the density 1.14 g/mL.

Further Polymers (FP):

FP-1 Linear low-density polyethylene (LLDPE) from BOREALIS®, sold under the STAMYLEX 08-026F brand name, with an MFR (melt flow rate) (190° C./2.16 kg) of 2.2 g/10 min according to ISO 1133 and a density of 0.910 g/cm$^3$ according to ISO 1183.

FP-2 Ultralow-density linear polyethylene (ULDPE) from DOW®, sold under the DOW ATTANE 4102G brand name, with an MVI (melt flow index) (190° C./2.16 kg) of 1 g/10 min according to ISO 1133 and a density of 0.905 g/cm$^3$ according to ASTM D792.

FP-3 Antiblock masterbatch from Schulman®, sold under the Polybatch FSU 105 E brand name, with a density of 0.98 g/cm$^3$ according to ISO 1183, Method A.

FP-4 Anhydride-modified linear low-density polyethylene (LLDPE) from Mitsubishi Chemical®, sold under the MODIC M603E brand name, with an MFR (melt flow rate) (190° C./21.2 N) of 1.9 g/cm$^3$ according to ISO 1133 and a density of 0.91 g/cm$^3$ according to ISO 1183, Method A.

FP-5 Low-density polyethylene (LDPE) from Lyondell-Basell®, sold under the Lupolen 2420 F brand name, with an MFR (melt flow rate) (190° C./2.16 kg) of 0.75 g/10 min.

FP-6 Anhydride-modified linear low-density polyethylene (LLDPE) from DuPont®, sold under the Bynel 4104 brand name, with an MFR (melt flow rate) (190° C./2.16 kg) of 1.1 g/10 min.

FP-7 A poly(ethylene-vinyl alcohol) (EVOH) from Kuraray®, sold under the EVAL F171B brand name, with an MFR (melt flow rate) (210° C./2.16 kg) of 1.8 g/10 min and an ethylene level of 32 mol %.

Production of Multilayer Films for Determination of Area Stretching Ratio and Hot Shrinkage:

Production of 5-Layer Primary Tubes:

For production of the primary tubes, a 5-layer tubular film system from PLAMEX® with a die head diameter of 80 mm was used. 4 extruders were used, which had a diameter of 50 mm (extruders A, B, C, D). Extruder A was laden with 67% FP-1, 30% FP-2 and 3% FP-3 and gave the outer layer. Extruder B was laden in each case with 100% polyamide composition and produced the middle layer. Extruder C was laden with 65% FP-1, 30% FP-2 and 5% FP-3 and gave the inner layer. Extruder D was laden with 100% FP-4 and gave the adhesion promoter layers. Between extruder D and die head there was a "Y" adapter, such that extruder D melted the material for two layers.

A primary tube of thickness 500 μm was produced. The layer sequence resulted from the compositions present in the extruders; the sequence of the extruders was as follows: C, D, B, D, A, and the following layer thicknesses were obtained from the respective extruders: extruder C 100 μm, D 37.5 μm each, B 225 μm and A 100 μm. The respective layer thickness was established via the respective extruder throughput.

The primary tubes were wound up and stored for one day before further processing.

Production of Shrink Films:

The primary tubes were unwound using a roll system and heated to 70° C.+/−5° C. In the startup process, there was subsequently dynamic introduction of air into the tube up to the stretch point, i.e. the maximum stretch. If the tube had been inflated, it was laid flat in a further roll system and stretched in machine direction, since the speed of the second roll system was higher than that of the first roll system. After the further roll system, samples were taken for the shrinkage measurements.

The components used and the results from the measurement of the area stretching ratio and hot shrinkage are reported in table 1:

TABLE 1

|  | C1 | I2 | I3 |
|---|---|---|---|
| Component | P-2 | P-3 | P-4 |
| Area stretching ratio | 11.2 | 12.6 | 14.65 |
| Shrinkage (MD) | 50% | 52% | 53% |
| Shrinkage (TD) | 50% | 52% | 55% |

While the tube comprising the polyamide composition P-2 inflated abruptly over and above a particular pressure, inflation was much more gentle with the polyamide compositions P-3 and P-4. In the case of polyamide composition P-2, there was therefore an increased incidence of bubble explosions on startup since the pressure was too high, and the startup was much more time-consuming for that reason.

Production of Multilayer Films in a Blowing Process for Determination of Modulus of Elasticity and Tear Propagation Resistance Multilayer films comprising four different materials were produced in a 7-layer blown film system from Collin® with a die head diameter of 180 mm. Of the 7 extruders, 6 had a diameter of 30 mm and one a diameter of 45 mm. The multilayer films obtained had a thickness of 100 μm and the layers a layer thickness of 15/14/14/14/14/15 μm. The extruders of the blown film system were supplied with the components in accordance with the structure of the multilayer films specified in table 2. Table 2 also states the properties of the multilayer films produced.

TABLE 2

|  |  | C4 | C5 | I6 | I7 |
|---|---|---|---|---|---|
| Structure |  | FP-5 // | FP-5 // | FP-5 // | FP-5 // |
|  |  | FP-6 // | FP-6 // | FP-6 // | FP-6 // |
|  |  | P-1 // | P-2 // | P-3 // | P-4 // |
|  |  | FP-7 // | FP-7 // | FP-7 // | FP-7 // |
|  |  | P-1 // | P-2 // | P-3 // | P-4 // |
|  |  | FP-6 // | FP-6 // | FP-6 // | FP-6 // |
|  |  | FP-5 | FP-5 | FP-5 | FP-5 |
| Modulus of elasticity (MD) | [MPa] | 990 | 824 | 798 | 682 |
| Modulus of elasticity (TD) | [MPa] | 966 | 784 | 770 | 618 |
| Tear propagation resistance (MD) | [mN] | 1932 (8N pendulum) | 3080 (8N pendulum) | 8972 (32N pendulum) | 6804 (32N pendulum) |
| Tear propagation resistance (TD) | [mN] | 2276 (8N pendulum) | 6124 (8N pendulum) | 9201 (32N pendulum) | 11058 (32N pendulum) |

Production of Monolayer Films in a Casting Process for Measurement of Specific Migration for Foodstuff Applications:

A monofilm of P-4 was produced in a cast film system from Weber® with a die head diameter of 150 mm. The extruder had a diameter of 30 mm. The throughput was 5 kg/h. The monofilm produced had a thickness of 50 μm and was wound directly after the chill roll. The results of the area-based and contents-based specific migration are reported in table 3.

TABLE 3

|  |  | Caprolactam | Hexamethylene-diamine | Adipic acid |
|---|---|---|---|---|
| Area-based migration | [mg/dm$^2$] | 2.56 | <detection limit | 1.5 |
| Contents-based migration | [mg/kg] | 15.34 | <detection limit | 9.0 |

Production of Monolayer Blown Films for Determination of Puncture Energy and Modulus of Elasticity:

Monofilms were produced in a 7-layer blown film system from Collin® having a die head diameter of 180 mm. Of the 7 extruders, 6 had a diameter of 30 mm (extruders B, C, D, E, F, G) and one a diameter of 45 mm (extruder A). The melt from extruder A was on the inside in the bubble; the melt from extruder G was on the outside. The sequence of layers, from the inside outward, was A, B, C, D, E, F, G. The monofilms produced had a thickness of 100 µm and the layers a layer thickness of 15/14/14/14/14/14/15 µm in the monofilms. All the extruders were laden with the same component. The films were slit open before being wound up.

The components used and the properties of the monofilms are reported in table 4.

TABLE 4

|  |  | C8 | C9 | I10 | I11 |
|---|---|---|---|---|---|
| Component |  | P-1 | P-2 | P-3 | P-4 |
| Modulus of elasticity (MD) | [MPa] | 666 | 484 | 391 | 338 |
| Modulus of elasticity (TD) | [MPa] | 678 | 457 | 402 | 267 |
| Dart drop | [N*mm] | 2.7 | 4.3 | 4.5 | 5.8 |

The invention claimed is:

1. A process for producing a polymer film (P) comprising a polyamide composition (PC), wherein the polyamide composition (PC) comprises nylon-6/6,6 and polyamide oligomers and where it is possible to extract in the range from 5% to 25% by weight, based on the total weight of the polyamide composition (PC), of polyamide oligomers from the polyamide composition (PC) according to ISO 6427: 2013, the process comprising:
   i) providing the polyamide composition (PC) in molten form in a first extruder,
   ii) extruding the polyamide composition (PC) provided in i) in molten form from the first extruder through an annular die to obtain a tube comprising the polyamide composition (PC) in molten form,
   iii) cooling the tube comprising the polyamide composition (PC) in molten form obtained in ii) in a water bath to a first temperature ($T_1$), which solidifies the polyamide composition (PC) to obtain a first tubular film comprising the polyamide composition (PC),
   iv) heating the first tubular film obtained in iii) to a second temperature ($T_2$) to obtain a heated first tubular film comprising the polyamide composition (PC),
   v) blowing air into the heated first tubular film obtained in iv), which stretches the heated first tubular film widthwise, and where the heated first tubular film is cooled to a third temperature ($T_3$) to obtain the polymer film (P) comprising the polyamide composition (PC).

2. The process according to claim 1, wherein the polymer film (P) comprises in the range from 0.1% to 80% by weight, based on the total weight of the polymer film (P), of the polyamide composition (PC).

3. The process according to claim 1 wherein the nylon-6/6,6 comprises in the range from 70% to 78% by weight of nylon-6 units and in the range from 22% to 30% by weight of nylon-6,6 units, based in each case on the total weight of the nylon-6/6,6.

4. The process according to claim 1, wherein the polyamide composition (PC) has a melting temperature ($T_{M(PC)}$) in the range from 178 to 187° C.

5. The process according to claim 1, wherein the tube obtained in ii) has a thickness in the range from 10 µm to 1 mm.

6. The process according to claim 1, wherein the first temperature ($T_1$) in iii) is in the range from 5 to 60° C.

7. The process according to claim 1, wherein the polyamide composition (PC) has a glass transition temperature ($T_{G(PC)}$) and a melting temperature ($T_{M(PC)}$), and the second temperature ($T_2$) in step iv) is above the glass transition temperature ($T_{G(PC)}$) and below the melting temperature ($T_{M(PC)}$) of the polyamide composition (PC).

8. The process according to claim 1, wherein the tube comprising the polyamide composition (PC), during the cooling in iii), is guided through a first roll system, which stretches the tube lengthwise.

9. The process according to claim 8, wherein the heated first tubular film comprising the polyamide composition (PC), during the blowing-in of air in v), is guided through a second roll system, which stretches the heated first tubular film lengthwise.

10. The process according to claim 9, wherein, after v), the process further comprises the following:
   vi) guiding the polymer film (P) obtained in v) over at least one third roll,
   vii) heating the polymer film (P) obtained in v) to a fourth temperature ($T_4$) which is above the glass transition temperature ($T_{G(PC)}$) of the polyamide composition (PC) to obtain a heated polymer film (P),
   viii) guiding the heated polymer film (P) obtained in vii) over at least one fourth roll to obtain the polymer film (P),
   where the heated polymer film (P), between vii) and viii), during viii) and/or after viii), is cooled to a fifth temperature ($T_5$) which is below the glass transition temperature ($T_{G(PC)}$) of the polyamide composition (PC).

11. The process according to claim 1, wherein the polymer film (P) has a thickness ≥0.1 µm and <1 mm.

12. A polymer film (P) obtained by a process according to claim 1.

13. A process for packaging foodstuffs, comprising:
   a) providing a foodstuff encased by at least one polymer film (P) according to claim 12, where the at least one polymer film (P) has a provision temperature ($T_B$),
   b) heating the at least one polymer film (P) to a shrink temperature ($T_S$), which shrinks the at least one polymer film (P) to obtain a foodstuff encased by the at least one shrunk polymer film (P).

14. The process according to claim 13, wherein the shrink temperature ($T_S$) in b) is in the range from 50 to 150° C.

15. The process according to claim 13, wherein the shrink temperature ($T_S$) in b) is above the glass transition temperature ($T_{G(PC)}$) of the polyamide composition (PC) present in the at least one polymer film (P).

16. The process according to claim 1, wherein the polymer film (P) is a multilayer film.

* * * * *